United States Patent
Gajendran et al.

(10) Patent No.: US 11,861,470 B2
(45) Date of Patent: Jan. 2, 2024

(54) SIMPLISTIC MACHINE LEARNING MODEL GENERATION TOOL FOR PREDICTIVE DATA ANALYTICS

(71) Applicant: State Farm Mutual Automobile Insurance Company, Bloomington, IL (US)

(72) Inventors: Suresh B. Gajendran, Richardson, TX (US); Mahesh Chandrappa, Bloomington, IL (US); Mark A. Dickneite, Bloomington, IL (US); Charles T. Fiala, Normal, IL (US); Rashid Zaheer, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 196 days.

(21) Appl. No.: 17/401,056

(22) Filed: Aug. 12, 2021

(65) Prior Publication Data

US 2022/0050695 A1    Feb. 17, 2022

Related U.S. Application Data

(60) Provisional application No. 63/065,424, filed on Aug. 13, 2020.

(51) Int. Cl.
*G06F 8/34* (2018.01)
*G06N 20/00* (2019.01)
(Continued)

(52) U.S. Cl.
CPC .............. *G06N 20/00* (2019.01); *G06F 8/34* (2013.01); *G06F 9/453* (2018.02); *G06F 18/214* (2023.01); *G06F 40/35* (2020.01); *G06N 3/045* (2023.01)

(58) Field of Classification Search
CPC ........ G06F 40/35; G06F 9/453; G06F 18/214; G06F 8/34; G06N 3/045; G06N 20/00
See application file for complete search history.

(56) References Cited

U.S. PATENT DOCUMENTS

| 8,682,814 B2 | 3/2014 | DiCorpo et al. |
| 9,218,574 B2 | 12/2015 | Phillipps et al. |

(Continued)

OTHER PUBLICATIONS

JP 6419859, "Interactive Interface For Machine Learning Model Evaluation", Nov. 7, 2018, 149 pgs <JP_6419859.pdf>.*

*Primary Examiner* — Tuan A Vu
(74) *Attorney, Agent, or Firm* — Lee & Hayes, P.C.

(57) ABSTRACT

Systems and methods for predictive data analytics are provided. A method comprises generating a guided user interface (GUI) that guides one or more user operations on the user interface including: obtaining, from a database, a dataset including a plurality of data objects; determining one or more characteristics associated with a first data object of the plurality of data objects; identifying a subset of the dataset based at least in part on the one or more characteristics; selecting at least one machine learning algorithm; and training a machine learning (ML) model with respect to the first data object using the subset of the dataset and the at least one machine learning algorithm to generate a trained ML model; implementing the trained ML model with respect to the first data object in a cloud server to enable distributing the trained ML model to a plurality of client device via a network.

19 Claims, 8 Drawing Sheets

(51) Int. Cl.
   *G06F 9/451*      (2018.01)
   *G06F 18/214*     (2023.01)
   *G06F 40/35*      (2020.01)
   *G06N 3/045*      (2023.01)

(56) References Cited

U.S. PATENT DOCUMENTS

| | | |
|---|---|---|
| 9,405,427 B2 | 8/2016 | Curtis et al. |
| 10,255,085 B1 | 4/2019 | Valsaraj et al. |
| 10,417,577 B2 | 9/2019 | Bowers et al. |
| 10,607,150 B2 | 3/2020 | Sainani et al. |
| 10,643,144 B2 | 5/2020 | Bowers et al. |
| 10,904,259 B1 * | 1/2021 | Rose ................. G06N 3/045 |
| 2016/0232457 A1 | 8/2016 | Gray et al. |
| 2019/0102098 A1 | 4/2019 | Biswas et al. |
| 2020/0012962 A1 | 1/2020 | Dent et al. |
| 2020/0134367 A1 | 4/2020 | Chopra et al. |
| 2020/0134368 A1 | 4/2020 | Chopra et al. |
| 2020/0134369 A1 | 4/2020 | Chopra et al. |
| 2020/0134370 A1 | 4/2020 | Chopra et al. |
| 2020/0293940 A1 | 9/2020 | Chopra et al. |
| 2021/0081841 A1 | 3/2021 | Sikka et al. |
| 2021/0089961 A1 | 3/2021 | Zeise et al. |
| 2021/0117780 A1 * | 4/2021 | Malik ................. G06F 40/35 |
| 2021/0209509 A1 | 7/2021 | Martin |

* cited by examiner

SIMPLISTIC MACHINE LEARNING MODEL GENERATION TOOL FOR PREDICTIVE DATA ANALYTICS

RELATED APPLICATIONS

This U.S. Patent application claims priority to provisional U.S. Patent Application No. 63/065,424, entitled "SIMPLISTIC MACHINE LEARNING MODEL GENERATION TOOL FOR PREDICTIVE DATA ANALYTICS," filed on Aug. 13, 2020, the entirety of which is incorporated herein by reference.

TECHNICAL FIELD

The present disclosure relates to a web-based application that provides user-interactive interfaces to generate a machine learned model, and more particularly to generating such a machine learned model for use in predictive data analytics.

BACKGROUND

Service providers in various consumer industries maintain a massive amount of data related to the consumers. This data is typically dispersed across multiple "dimensions" that reflect various characteristics of the consumers. Such dimensions include, for example, the age of the consumer, the gender of the consumer, the race of the consumer, the occupation of the consumer, the annual income of the consumer, the marital status of the consumer, the type of services that are consumed over the time, etc. Particularly, for service providers in the auto insurance industry, such dimensions of consumer data may also include the type of vehicle-specific services that are consumed over the time, the type of claims that are filed over the time, the traffic violations associated with the consumer over the time, etc.

Numerous efforts have been undertaken to discover correlations among various dimensions of consumer data. However, for a given product or service, identifying the key features that influence sales based on such correlations can be complex and time consuming, and may require specialized training related to dataset analysis. Traditionally, data scientists with in-depth knowledge in statistics coupled with insurance domain knowledge have been relied on to develop and provide such analysis. More recently, machine learning (ML) algorithms have been relied on to identify correlations between items in large datasets. In such efforts, a dataset may be divided into multiple parts. One or more parts of the dataset can then be used to train a ML model and the rest of the dataset can be used to test the trained ML model (also referred to herein as the "trained ML model"). Once the trained ML model has been tested to verify that it satisfies a desired level of prediction accuracy, the trained ML model can be implemented across multiple enterprise platforms (e.g., across auto insurance and claim operations platforms).

However, with the limited availability of data scientists and the long cycle time required to develop ML models, deploying such ML models can, at least initially, cause significant reductions in the efficiency of business operations. Example embodiments of the present disclosure are directed toward addressing these difficulties.

SUMMARY

According to a first aspect, a method implemented by a computing device for predictive data analytics comprises generating a guided user interface (GUI) that guides one or more user operations on the user interface causing the computing device to construct a machine learning model, the one or more user operations on the user interface including: obtaining, from a database, a dataset including a plurality of data objects; determining one or more characteristics associated with a first data object of the plurality of data objects; identifying a subset of the dataset based at least in part on the one or more characteristics; selecting at least one machine learning algorithm; and training a machine learning (ML) model with respect to the first data object using the subset of the dataset and the at least one machine learning algorithm to generate a trained ML model with respect to the first data object; implementing the trained ML model with respect to the first data object in a cloud server to enable distributing the trained ML model to a plurality of client device via a network.

According to a second aspect, a system for predictive data analytics comprises at least one processor, and memory storing instructions that, when executed by the at least one processor, cause the at least one processor to perform various actions. Such actions include generating a guided user interface (GUI) that guides one or more user operations on the user interface causing the computing device to construct a machine learning model, the one or more user operations on the user interface including: receiving a dataset including a plurality of data objects; determining one or more characteristics associated with a first data object of the plurality of data objects; identifying a subset of the dataset based at least in part on the one or more characteristics; selecting at least one machine learning algorithm; and training a machine learning (ML) model with respect to the first data object using the subset of the dataset and the at least one machine learning algorithm to generate a trained ML model with respect to the first data object; implementing the trained ML model with respect to the first data object in a cloud server to enable distributing the trained ML model to a plurality of client device via a network.

A third aspect of the present disclosure includes a computer-readable storage medium storing computer-readable instructions executable by one or more processors. When executed by the one or more processors, the instructions cause the one or more processors to perform actions comprising: generating a guided user interface (GUI) that guides one or more user operations on the user interface including: obtaining, from a database, a dataset including a plurality of data objects; determining one or more characteristics associated with a first data object of the plurality of data objects; identifying a subset of the dataset based at least in part on the one or more characteristics; selecting at least one machine learning algorithm; and training a machine learning (ML) model with respect to the first data object using the subset of the dataset and the at least one machine learning algorithm to generate a trained ML model with respect to the first data object; implementing the trained ML model with respect to the first data object in a cloud server to enable distributing the trained ML model to a plurality of client device via a network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
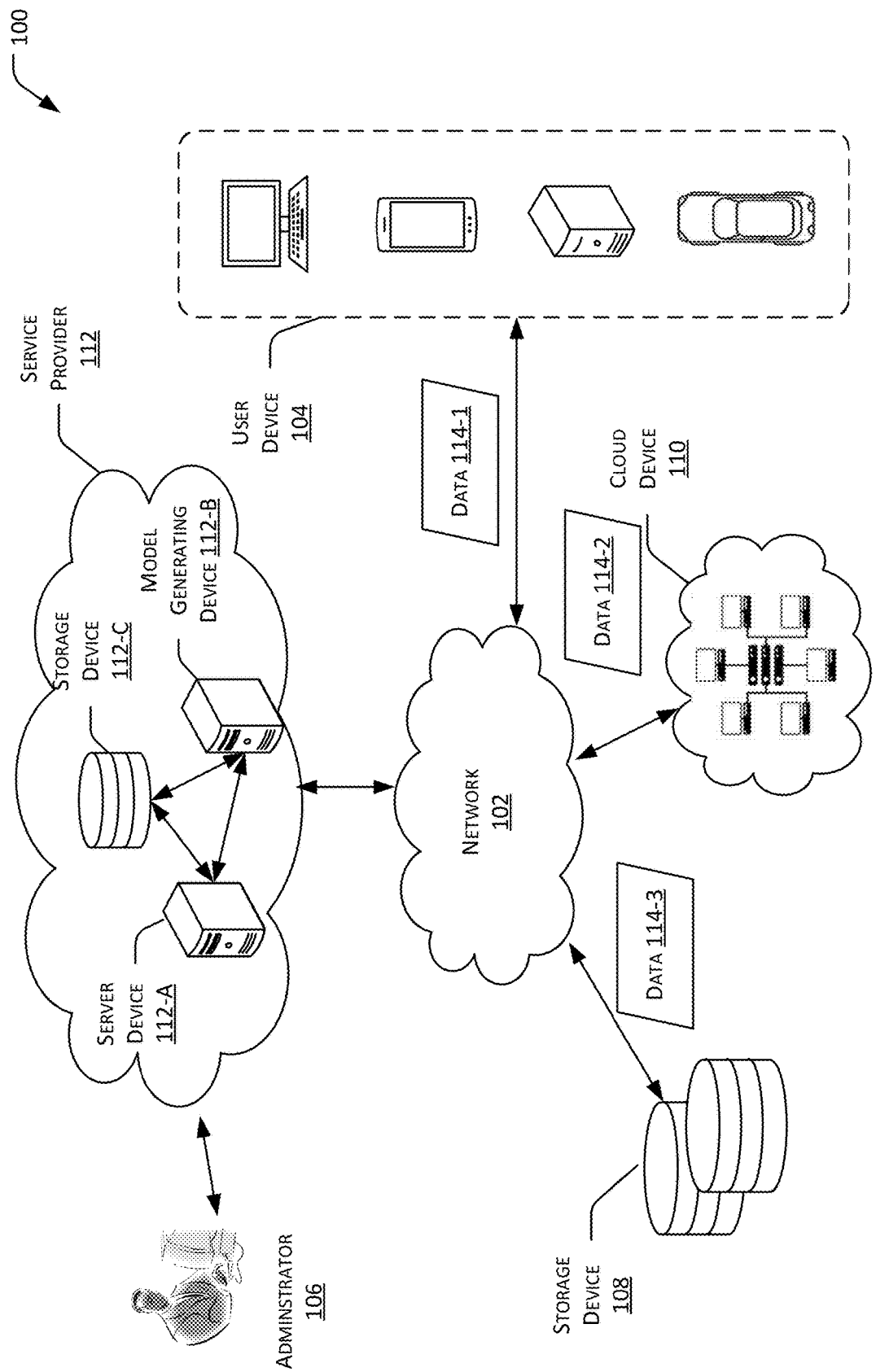
FIG. 1 illustrates an example network environment for generating an ML model generation tool in accordance with an implementation of the present disclosure.

FIG. 1 illustrates an example network environment 100 for generating an ML model generation tool in accordance with an implementation of the present disclosure.

As illustrated in FIG. 1, the network environment 100 includes a network 102, one or more user devices 104, one or more storages device 108, one or more cloud devices 110, and/or a service provider 112. The network 102 may be a single network or a combination of different networks. For example, the network 102 may be a local area network (LAN), a wide area network (WAN), a public network, a private network, a proprietary network, a Public Telephone Switched Network (PSTN), an Internet, a wireless network, a virtual network, a satellite network, or any combination thereof. The network 102 may also include various network access points, e.g., wired or wireless access points such as base stations or Internet exchange points, through which a data source may connect to the network 102 in order to transmit data 114-1, 114-2, 114-3, etc. (collectively referred to herein as "data 114"), via the network 102.

The one or more user devices 104 may be any type of computing devices including, but not limited to, a desktop computer, a laptop computer, a built-in device in a motor vehicle, or a mobile device. In implementations, the one or more user devices 104 may also include wearable devices, such as a smart watch, smart glasses, smart shoes, electronic textiles, etc. Using one or more of the user devices 104, a user (not shown) may send data 114-1 to the service provider 112 via the network 102 voluntarily or in response to a request from the service provider 112 or a third-party. The user may be an existing customer of the service provider 112. For example, the user may be a policy holder of an auto insurance service or of any other type of insurance policy (e.g., home, life, etc.). In implementations, the user may be a potential customer of the service provider 112. The data 114-1 may include, but not limited to, a potential customer survey data, insurance quote data, customer information, vehicle information, accident and claim information, etc. The data 114-1 may be real-time data or data that is accumulated over a period of time.

It should be appreciated that the data 114-1, 114-2, and 114-3 shown in FIG. 1 are merely for the purpose of illustration. The data 114-1 generated by one or more of the user devices 104 may be uploaded to a remote database (e.g., storage device 108), a cloud storage (not shown in FIG. 1) associated with the cloud devices 110, or the storage device 112-C associated with the service provider 112. As such, the content of the data 114-1, 114-2, and 114-3 may have certain level of overlap, yet, each of the data 114-1, 114-2, and 114-3 may also include non-overlapping information The service provider 112 may include a server device 112-A, a model generating device 112-B, and/or a storage devices 112-C. The service provider 112 may utilize one or more of the server device 112-A, the model generating device 112-B, or the storage devices 112-C to provide internet-based services, for example, banking services, auto-insurance services, home security services, etc. The server device 112-A may implement software and/or applications enabling online to offline operations. The software and/or applications may include various versions or instances that can be installed or created in the user devices (e.g., the one or more user devices 104). The software and/or applications may be stored on the storage device 112-C. The model generating device 112-B may be any type of computing device that is configured to generate a ML model. It should be understood that the server device 112-A, the model generating device 112-B, and/or the storage device 112-C shown in FIG. 1 are merely for illustration purpose. The present disclosure is not intended to be limiting. The model generating device 112-B can be integrated to the server device 112-A. In implementations, the model generating device 112-B can be located at a third-party service provider connected to the network 102. The storage device 112-C may be physically connected to and in communication with the same intranet of the server device 112-A. In implementations, the storage device 112-C may be a cloud storage space provided by a cloud service provider.

In some examples, the model generating device 112-B generates a web-based tool that enables a user to generate, modify, or train the ML models from any computing device connected to the network 102. The web-based tool and the pre-generated ML models (i.e., the pre-trained ML models) may be further implemented on a cloud-based system, for example, the cloud device 110. The web-based tool and the pre-trained ML model may be distributed to any computing devices connected to the cloud-base system. Any computing devices connected to the cloud-based system may download the web-based tool and the pre-trained ML model to the local storage and perform data analysis using the trained ML model. In some examples, the user may modify the pre-trained ML model via the web-based tool, or generate additional ML models via the we-based tool.

An administrator 106 of the service provider may access the one or more server devices 112-A, one or more model generating devices 112-B, and/or one or more storage devices 112-C for perform a task. For example, as will be described in greater detail below, the administrator 106 may send a request via the network 102 to the one or more user devices 104 to obtain data 114-1 stored thereon. In implementations, the administrator 106 may retrieve data stored on the one or more storage devices 112-C. In other implementations, the administrator 106 may retrieve data 114-3 stored on the one or more storage device 108 via the network 102. Additionally, or alternatively, the administrator 106 may retrieve data 114-2 from one or more cloud devices 110. The one or more cloud devices 110 may include a cloud service provider or a third-party service provider that is affiliated with the service provider, for example, a product manufacture or an application provider that sells the product or service through a service provider platform.

The example network environment 100 illustrated in FIG. 1 facilitates a user of the ML model generating system to obtain data from various resources, via the network 102, to train the ML model. For example, to train a ML model to predict potential users of a newly proposed auto-insurance plan, the user may obtain data 114-3 stored in the storage device 108 via the network 102. The data 114-3 may include information related to former and existing customers of the auto-insurance company. Alternatively, or additionally, the user may obtain data 114-1 from the user devices 104 and/or and data 114-2 from the cloud device 110, via the network 102. The data 114-1 and 114-2 may include information related to potential customers, such as, consuming behaviors, social activities, travel frequencies and preferences, etc. The example network environment as illustrated in FIG. 1 provides the user the availability and flexibility to utilize various types of data to train the ML model to achieve optimal prediction results. In addition, the example network environment as illustrated in FIG. 1 provides a web-based application with a guided user interface (GUI) that enables the user to build new ML models and/or modify the pre-trained ML models based on various business analysis needs. The GUI provides step-by-step instructions to the user to configure one or more parameters related to data analysis and prediction using the ML model and datasets from various data sources.

Figure 2:
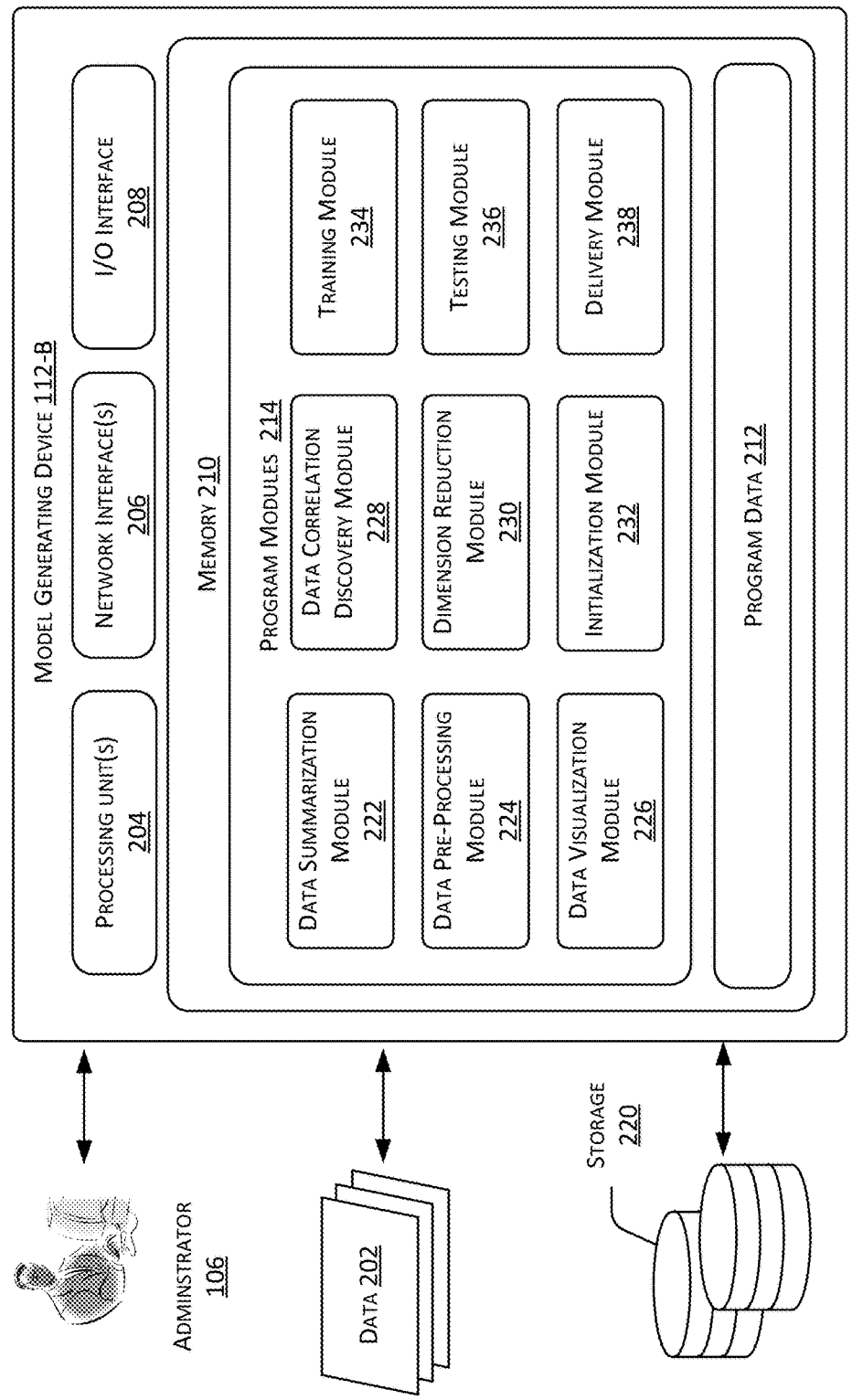
FIG. 2 illustrates an example configuration of a device for generating an ML model generation tool in accordance with an implementation of the present disclosure.

FIG. 2 illustrates an example configuration 200 of a device for generating an ML model generation tool in accordance with an implementation of the present disclosure. As illustrated in FIG. 2, the example configuration 200 of the ML model generating device 112-B may include, but is not limited to, one or more processing units 204, one or more network interfaces 206, an input/output (I/O) interface 208, and a memory 210.

In implementations, the processing units 204 may be configured to execute instructions that are stored in the memory 210, received from the input/output interface 208, and/or the network interface 206. In implementations, the processing units 204 may be implemented as one or more hardware processors including, for example, a microprocessor, an application-specific instruction-set processor, a physics processing unit (PPU), a central processing unit (CPU), a graphics processing unit, a digital signal processor, a tensor processing unit, etc. Additionally or alternatively, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

The memory 210 may include machine readable media in a form of volatile memory, such as Random Access Memory (RAM) and/or non-volatile memory, such as read only memory (ROM) or flash RAM. The memory 210 is an example of machine readable media. The machine readable media may include a volatile or non-volatile type, a removable or non-removable media, which may achieve storage of information using any method or technology. The information may include a machine readable instruction, a data structure, a program module or other data. Examples of machine readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing node. As defined herein, the machine readable media does not include any transitory media, such as modulated data signals and carrier waves.

In implementations, the network interfaces 206 may be configured to connect the model generating device 112-B to other computing devices via the network 102. The network interfaces 206 may be established through a network interface controller (NIC), which may employ both hardware and software in connecting the model generating device 112-B to the network 102. Each type of NIC may use a different type of fabric or connector to connect to a physical medium associated with the network 102. Examples of types of fabrics or connectors may be found in the IEEE 802 specifications, and may include, for example, Ethernet (which is defined in 802.3), Token Ring (which is defined in 802.5), and wireless networking (which is defined in 802.11), an InfiniBand, etc.

In implementations, the model generating device 112-B may further include other hardware components and/or other software components, such as program modules 214 to execute instructions stored in the memory 210 for performing various operations, and program data 212 for storing data related to various operations performed by the program modules 214. The program modules 214 may include a data summarization module 222, a data pre-processing module 224, a data visualization module 226, a data correlation discovery module 228, a dimension reduction module 230, an initialization module 232, a training module 234, a testing module 236, and a delivery module 238.

The data summarization module 222 may be configured to generate a summary of a dataset 202 received through the network interface 206. The model generating device 112-B may generate the guided user interface (GUI) (i.e., a graphic user interface) on a terminal device that the administrator 106 operates. The guided user interface may be compatible with the input/output (I/O) interface 208. The administrator 106 may obtain the dataset 202 from various data storages and import the dataset to the model generating device 112-B by operating the guided user interface. The dataset 202 may be any combinations of the data 114-1, 114-2, or 114-3 shown in FIG. 1, and may be stored on the program data 212. The dataset 202 can be in any computer readable format, for example, and without limitation, text file format or comma-separated values (CSV) file format. Given CSV file format as an example, based on the input of the administrator 106 via the guided user interface, the data summarization module 222 determines a count of rows and a count of columns of the dataset. The columns of the dataset may denote a plurality of variables or objects and the rows of the dataset may denote respective values corresponding to the plurality of variables or objects. The data summarization module 222 may generate the summary including the count of columns, the count of rows, and a total count of data items in the dataset. In implementations, based on the input of the administrator 106 via the guided user interface, the data summarization module 222 may further calculate statistics of the respective values corresponding to each of the plurality of variables or objects, for example, a sum of the respective values corresponding to each of the plurality of variables or objects, a mean value of the respective values corresponding to each of the plurality of variables or objects, a median value of the respective values corresponding to each of the plurality of variables or objects, a standard deviation of the respective values corresponding to each of the plurality of variables or objects, a minimum value of the respective values corresponding to each of the plurality of variables or objects, a maximum value of the respective values corresponding to each of the plurality of variables or objects, etc.

The data pre-processing module 224 may be configured to receive the dataset 202 and the summary of the dataset 202 from the data summarization module 222 and pre-process the dataset 202 based on the input of the administrator 106 via the guided user interface. The model generating device 112-B may update the guided user interface to guide the administrator 106 to select the pre-processing operations. The pre-processing operations on the dataset 202 may include removing null values in the dataset or replacing the null values with a selected value, e.g., a mean value or a median value indicated in the summary of the dataset 202. Alternatively, or additionally, the pre-processing operations on the dataset 202 may also include dropping duplicate columns of the dataset, i.e., duplicate variables or objects. The pre-processing operations on the dataset 202 may further include outliers treatment. For a given variable, outliers are those observations that lie outside 1.5*Inter Quartile Range (IQR), where IQR is the difference between $75^{th}$ and $25^{th}$ percentiles. The outliers treatment may include imputations of the outliers with a mean value, a median value, a mode value, etc. Alternatively, or additionally, the outliers treatment may include capping of the outliers. For missing values that lie outside the 1.5*IQR limits, the pre-processing operations may cap them by replacing those observations below the lower limit with the value of $5^{th}$ % and those observations above the upper limit with the value of $95^{th}$ %. In implementations, the pre-processing operations on the dataset 202 may be performed on ordinal categorical variables. In other implementations, the pre-processing operations on the dataset 202 may be performed on numerical values of a single variable or object.

Figure 3A:
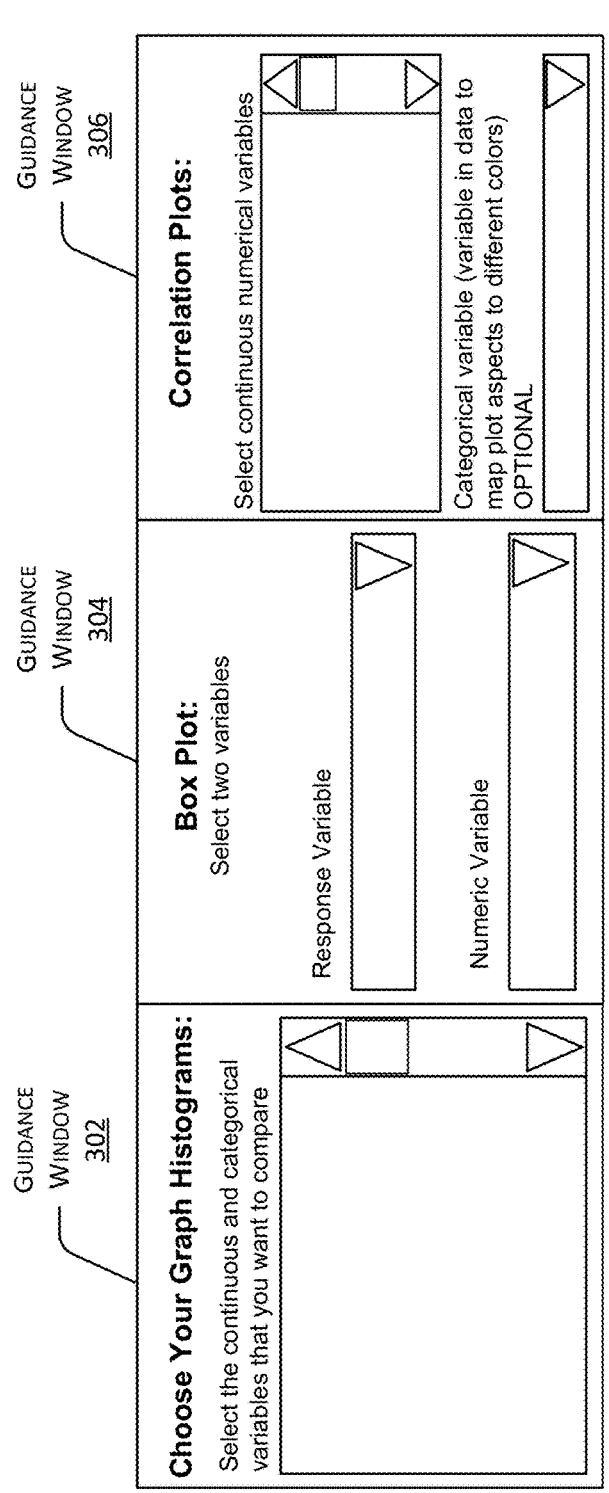
FIG. 3A illustrates an example interface for generating an ML model generation tool in accordance with an implementation of the present disclosure.
Figure 3B:
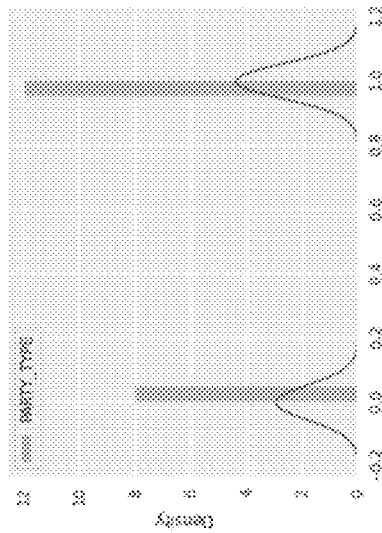
FIG. 3B illustrates another example interface for generating an ML model generation tool in accordance with an implementation of the present disclosure.
Figure 3B:
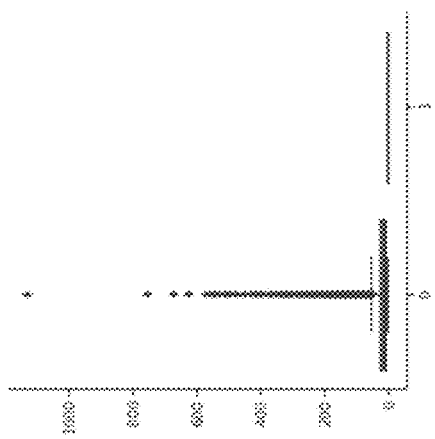
Figure 3B:
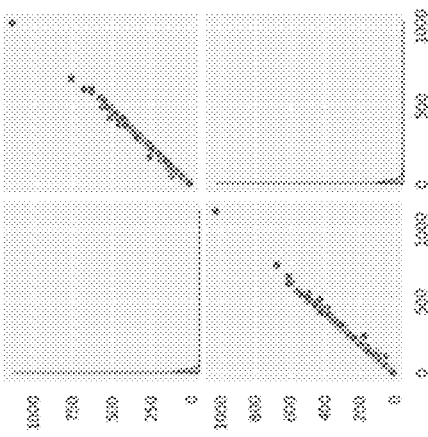

The data visualization module 226 may be configured to receive the pre-processed dataset 202 from the data pre-processing module 224 and generate one or more graphic illustrations of the dataset 202 based on the input of the administrator 106 via the guided user interface. The model generating device 112-B may update the guided user interface to guide the administrator 106 to select the types of the graphic illustrations. For example, and without limitation, the one or more graphic illustrations may include histograms of the dataset, box plots of the dataset, pie plots of the dataset, correlation plots of the dataset, scattered plots of the dataset, etc. The guided user interface may provide user interactive guidance enabling the administrator 106 to select a portion or a combination of different portions of the dataset 202 to be presented. The data visualization module 226 then also generates the one or more graphic illustrations of a portion of the dataset 202 based on the input of the administrator 106 via the guided user interface. The data visualization module 226 presents the pre-processed dataset 202 in various illustrations that facilitates the user to further discover the correlations between different variables or objects. For instance, FIGS. 3A and 3B illustrate an example interface 300 generated by the data visualization module 226 and associated with generating an ML model generation tool. Aspects of the example interface 300 shown in FIGS. 3A and 3B will be described in greater detail below.

With continued reference to FIG. 2, the data correlation discovery module 228 may be configured to receive the pre-processed dataset 202 from the data pre-processing module 224 and identify various relationships among the plurality of variables or objects. For example, based on one or more correlation plots of the dataset 202 generated by the data visualization module 226, the data correlation discovery module 228 may identify linear dependencies for a given variable or object. The data correlation discovery module 228 may further identify cross correlations for a given variable or object. Based on the linear dependencies and cross correlations, the data correlation discovery module 228 may further identify one or more highly-correlated variables or objects with respect to the given variable or object, i.e., the best features of the given variable or object. In implementations, the one or more highly correlated variables or objects may be a pre-set number of highly correlated variables or objects. Alternatively, or additionally, the one or more highly-correlated variables or objects may be determined based on a pre-set threshold. The variables or objects having correlation degrees that exceed the pre-set threshold may be determined as highly-correlated to the target variable or target object.

The dimension reduction module 230 may be configured to receive the pre-processed dataset 202 from the data pre-processing module 224 and perform dimension reduction on the dataset 202 based at least on the highly-correlated variables or objects associated with a target variable or target object. The dimension reduction module 230 may map the original dimension of dataset 202 (i.e., the high-dimension of dataset) to a low-dimension of dataset so that the variance of the data values in the low-dimension representation is maximized. The low-dimension of dataset may be used as a training dataset of a machine learning model. The dimension reduction module 230 may implement various algorithms to perform dimension reduction on the dataset including, but not limited to, random forest algorithm, K-nearest neighbors algorithm, principle component analysis (PCA), non-negative matrix factorization (NMF), kernel PCA, graph-based kernel PCA, linear discriminant analysis (LDA), generalized discriminant analysis (GDA), single variable logistic regression algorithm, variable clustering algorithm, etc. The model generating device 112-B may update the guided user interface to guide the administrator 106 to select the algorithms for dimension reduction.

The initialization module 232 may be configured to initialize a ML model based on the input of the administrator 106 via the guided user interface. The model generating device 112-B may update the guided user interface to facilitate the administrator 106 to select one or more parameters associated with the ML model. For example, and without limitation, the one or more parameters may include an algorithm to be used for the ML model, a target variable or object to be predicted, one or more key features used to predict the target variable, etc. The algorithm to be used for the ML model may include, but not limited to, supervised learning, unsupervised learning, semi-supervised learning, reinforcement learning, feature learning, sparse dictionary learning, etc. The one or more key features may be obtained based on the results from the dimension reduction module 230. In implementations, the one or more parameters may further include a parameter k related to k-fold cross-validation of the machine learning model. The cross-validation refers to a resampling procedure to evaluate a trained ML model on the training dataset. The parameter k refers to a number of groups that the training dataset is split into. In a 3-fold cross-validation, the training dataset is split into three groups, among which, two groups of the training dataset may be used for training and one group of the training dataset may be used for testing. It should be understood that the one or more parameters associated with the ML model described above are merely for illustration purpose. The present disclosure is not intended to be limiting.

Once the one or more parameters associated with the ML model are set, the training module 234 may train the ML model based on the training dataset and to generate a trained ML model. The testing module 236 may validate the trained ML model before the trained ML model is delivered. Once the trained ML model is validated to satisfy a pre-set prediction accuracy, the delivery module 238 may deliver the trained ML model to be stored in a storage space, e.g., the storage device 112-C, or the storage device 108. Alternatively, or additionally, the delivery module 238 may deliver the trained ML model to be implemented on any computing devices, e.g., the one or more user devices 104.

It should be appreciated that the data summarization module 222, the data pre-processing module 224, the data visualization module 226, the data correlation discovery module 228, the dimension reduction module 230, the initialization module 232, the training module 234, the testing module 236, and the delivery module 238 shown in FIG. 2 are merely for illustration purpose. The functions of one or more of those modules may be integrated to one single module. The present disclosure is not intended to be limiting.

FIG. 3A illustrates an example interface for generating an ML model generation tool in accordance with an implementation of the present disclosure. The example interface 300 may be generated by the data visualization module 226 and provide a guided user interface to guide the administrator 106 to select the types of the graphic illustrations to present the dataset 202. The example interface 300 may include a guidance window 302 to facilitate user to select a variable from the dataset 202 to generate a graph histogram of the numerical values associated with the variable. The example interface 300 may further include a guidance window 304 to facilitate user to select multiple variables and generate a box plot and/or a scattered plot of the numerical values associated with the multiple variables. The example interface 300 may include a guidance window 306 to facilitate the user to select multiple variables and generate correlation plots associated with the multiple variables. The example interface 300 provides an interactive window to the user to analyze the dataset 202 and determine highly-correlated variables to be used for generating the ML model. The example interface 300 merely illustrates the guided user interface generated during the data visualization process. The example interface 300 may include different interactive windows during different stages of generating the ML model. By generating the interactive windows in each stage, the model generating device 112-B can provide the user with full manipulation of the dataset 202 and flexibility to determine the algorithms and parameters associated with the ML model.

FIG. 3B illustrates another example interface for generating an ML model generation tool in accordance with an implementation of the present disclosure. After the user selects the graph histograms in the guidance window 302, the response variable and numeric variable in the guidance window 304, and the correlation variables in the guidance window 306, the data visualization module 226 may display the histograms, the box plots, and the correlation associated with the dataset as illustrated by Plot-A, Plot-B, and Plot-C, respectively. As the selected dataset characters are visualized via the guided user interface, the user can efficiently determine the parameters or the variables that are highly corrected to a target object and use only those highly-corrected parameters to generate the ML model.

The methods described in FIGS. 4-7 are described in the general context of machine-executable instructions. Generally, machine-executable instructions can include routines, programs, objects, components, data structures, procedures, modules, functions, and the like that perform particular functions or implement particular abstract data types. Furthermore, each of the example methods are illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Figure 4:
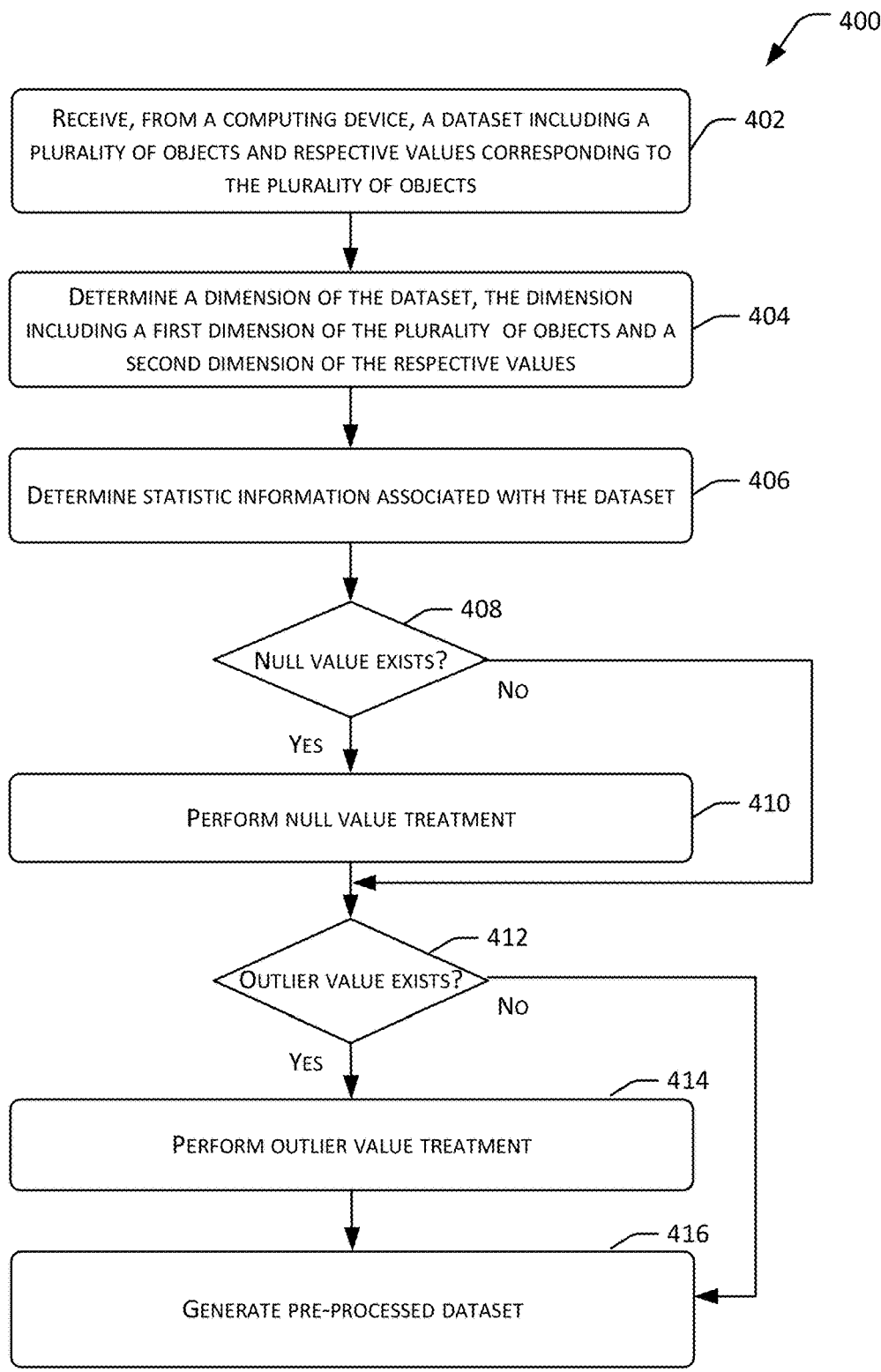
FIG. 4 illustrates an example flow chart for generating an ML model generation tool in accordance with an implementation of the present disclosure.

FIG. 4 illustrates an example flow chart 400 for generating an ML model generation tool in accordance with an implementation of the present disclosure.

At block 402, the model generating device 112-B may receive, from a computing device, a dataset including a plurality of objects and respective values corresponding to the plurality of objects. The dataset may be stored in any computer readable format, in which, the plurality of objects may also refer to a plurality of variables. In implementations, the values included in the dataset may represent consumer information associated with a service provider, such as, consumer's age, gender, race, occupation, annual income, products and/or services purchased from the service provider, claims filed and/or processed by the service provider, etc. The model generating device 112-B may load the dataset from a storage device connected to a local computer network. Alternatively, or additionally, the model generating device 112-B may obtain the dataset from a remote storage space, such as, a cloud storage space, or a third-party storage space, etc.

At block 404, the model generating device 112-B may determine a dimension of the dataset, the dimension including a first dimension of the plurality of objects and a second dimension of the respective values. The model generating device 112-B may determine counts of columns and rows that correspond to the dimensions of the dataset. The model generating device 112-B may further determine a total count of data items in the dataset. In implementations, the dimension of the dataset may be determined by the data summarization module 222 of the model generating device 112-B. The data summarization module 222 determines a count of rows and a count of columns of the dataset. The columns of the dataset may denote a plurality of variables or objects and the rows of the dataset may denote respective values corresponding to the plurality of variables or objects.

At block 406, the model generating device 112-B may determine statistic information associated with the dataset. The statistic information may include mean values, median values, standard deviations, distributions that the data items fit into, etc. The model generating device 112-B may determine the statistic information for each of the plurality of objects that have numerical values. In implementations, non-numerical values associated with the objects may be digitized and statistic information may be determined based on the digitized values associated with these objects. In implementations, the statistic information associated with the dataset may be determined by the data summarization module 222 of the model generating device 112-B.

At block 408, the model generating device 112-B may determine whether null value exists in the dataset. If the null value exists in the dataset (block 408—Yes), the model generating device 112-B may preform null value treatment at bock 410. The null value treatment may include, but is not limited to, removing the null value from the dataset, replacing the null value with a pre-set value, e.g., a mean value, a median value, etc.

If the null value does not exist in the dataset (block 408—No), the model generating device 112-B may further determine whether outlier value exists in the dataset at block 412. If the outlier value exists in the dataset (block 412—Yes), the model generating device 112-B may preform outlier value treatment at bock 414. The outlier value treatment may include imputations of the outliers with a mean value, a median value, a mode value, etc. Alternatively, or additionally, the outlier value treatment may include capping of the outliers. For missing values that lie outside the 1.5*IQR limits, the pre-processing operations may cap them by replacing those observations below the lower limit with the value of $5^{th}$ % and those observations above the upper limit with the value of $95^{th}$ %. If an outlier value does not exist in the dataset (block 412—No), the model generating device 112-B may proceed directly from block 412 to block 416. At block 416, the model generating device (e.g., the model generating device 112-B) may generate pre-processed dataset after the null value and outlier value treatments are performed. In implementations, the operations described with respect to blocks 408-416 may be performed by the data pre-processing module 224 of the model generating device 112-B.

The example method described with respect to FIG. 4 performs an initial assessment of the dataset, summarizes the dimension and statistic information related to the dataset, and performs treatments on the null values and outlier values in the dataset. The operations described herein help the user to learn the characteristics of the dataset including, but not limited to, data types, data distribution characteristics, missing features and observation count. Training the ML model using the pre-processed dataset (i.e., with removed null values and/or replaced outlier values) also improves the prediction outcome of the ML model.

Figure 5:
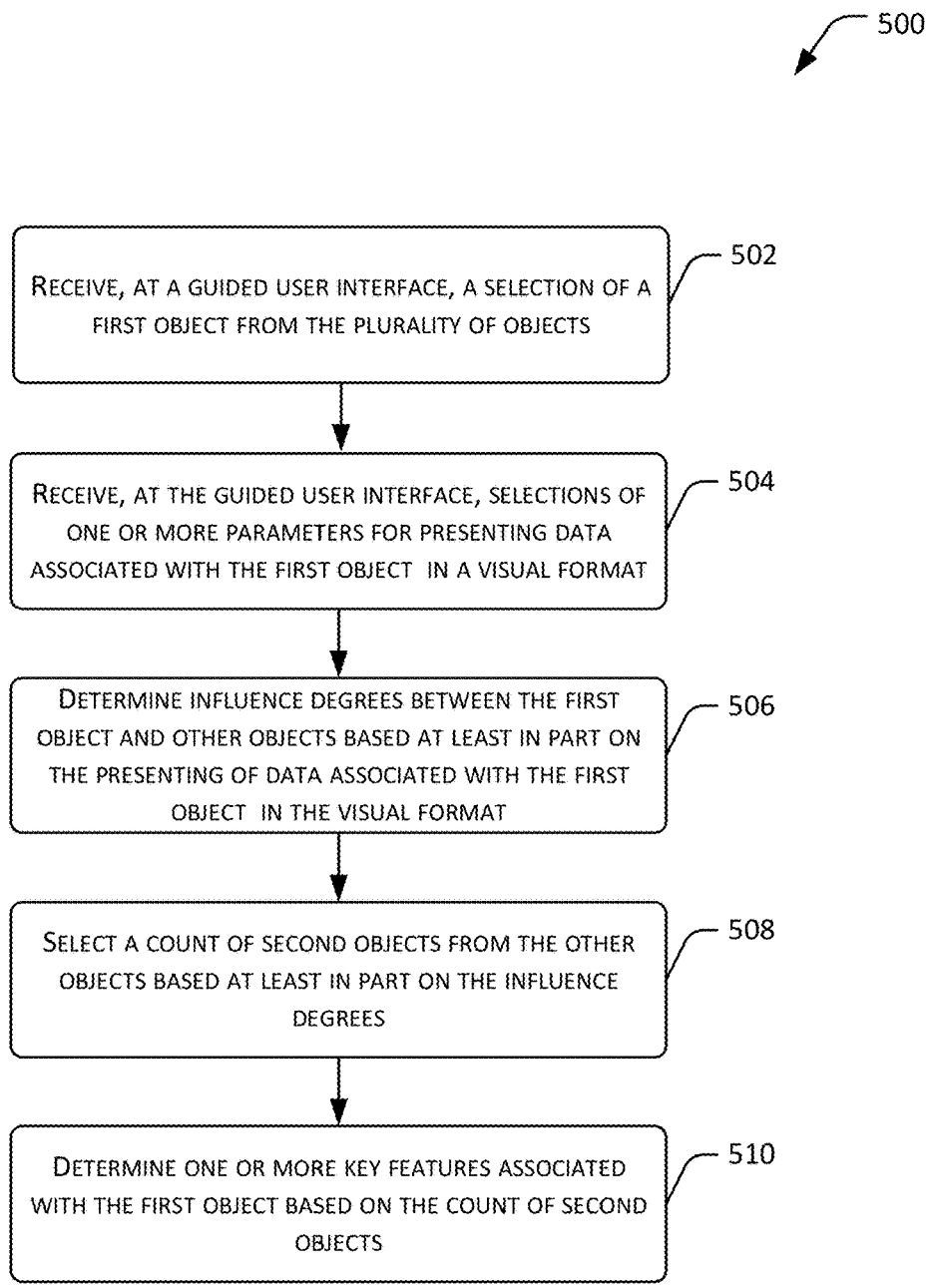
FIG. 5 illustrates another example flow chart for generating an ML model generation tool in accordance with an implementation of the present disclosure.

FIG. 5 illustrates another example flow chart 500 for generating an ML model generation tool in accordance with an implementation of the present disclosure.

At block 502, the model generating device 112-B may receive, at a guided user interface, a selection of a first object from the plurality of objects. A user (e.g., the administrator 106) may select the first object from the plurality of objects and identify one or more second objects that are highly correlated to the first object. In implementations, the operation of block 502 may be performed by the data visualization module 226 of the model generating device 112-B.

At block 504, the model generating device 112-B may receive, at the guided user interface, selections of one or more parameters for presenting data associated with the first object in a visual format. The one or more parameters may include the visual formats for presenting data, such as, histograms of the dataset, box plots of the dataset, pie plots of the dataset, correlation plots of the dataset, scattered plots of the dataset, etc. In implementations, the one or more parameters may further include a list of objects that the user can choose from to observe the correlations between the objects. In implementations, the operation of block 504 may be performed by the data visualization module 226 of the model generating device 112-B.

At block 506, the model generating device 112-B may determine influence degrees between the first object and other objects based at least in part on the presenting of data associated with the first object in the visual format. The correlations between the objects may be represented as a correlation matrix having a plurality of correlation coefficients. The greater a correlation coefficient, the higher correlation between two objects. For the given first object, other objects that have greater correlation coefficients may be determined as having higher influence degrees therebetween. In implementations, the operation of block 506 may be performed by the data correlation discovery module 228 of the model generating device 112-B.

At block 508, the model generating device 112-B may select a number of second object from the other objects based at least in part on the influence degrees. The model generating device 112-B may select the number of second object based on a pre-set threshold related to the influence degrees. Alternatively, or additionally, the model generating device 112-B may select a pre-set top number of second objects based on the ranked influence degrees. In implementations, the operation of block 508 may be performed by the data correlation discovery module 228 of the model generating device 112-B.

At block 510, the model generating device 112-B may determine one or more key features associated with the first object based on the count of second objects. The one or more key features may refer to at least part of the second objects that influences the prediction outcome with respect to the first object. In implementations, the operation of block 510 may be performed by the data correlation discovery module 228 of the model generating device 112-B.

The example method described with respect to FIG. 5 explores the relationships among the plurality of variables in the dataset. Given a target variable, the example method determines one or more variables highly-related to the target variable. The ML model with respect to the target variable can be trained using the numerical values associated with the one or more highly-related variables to achieve better prediction performance.

Figure 6:
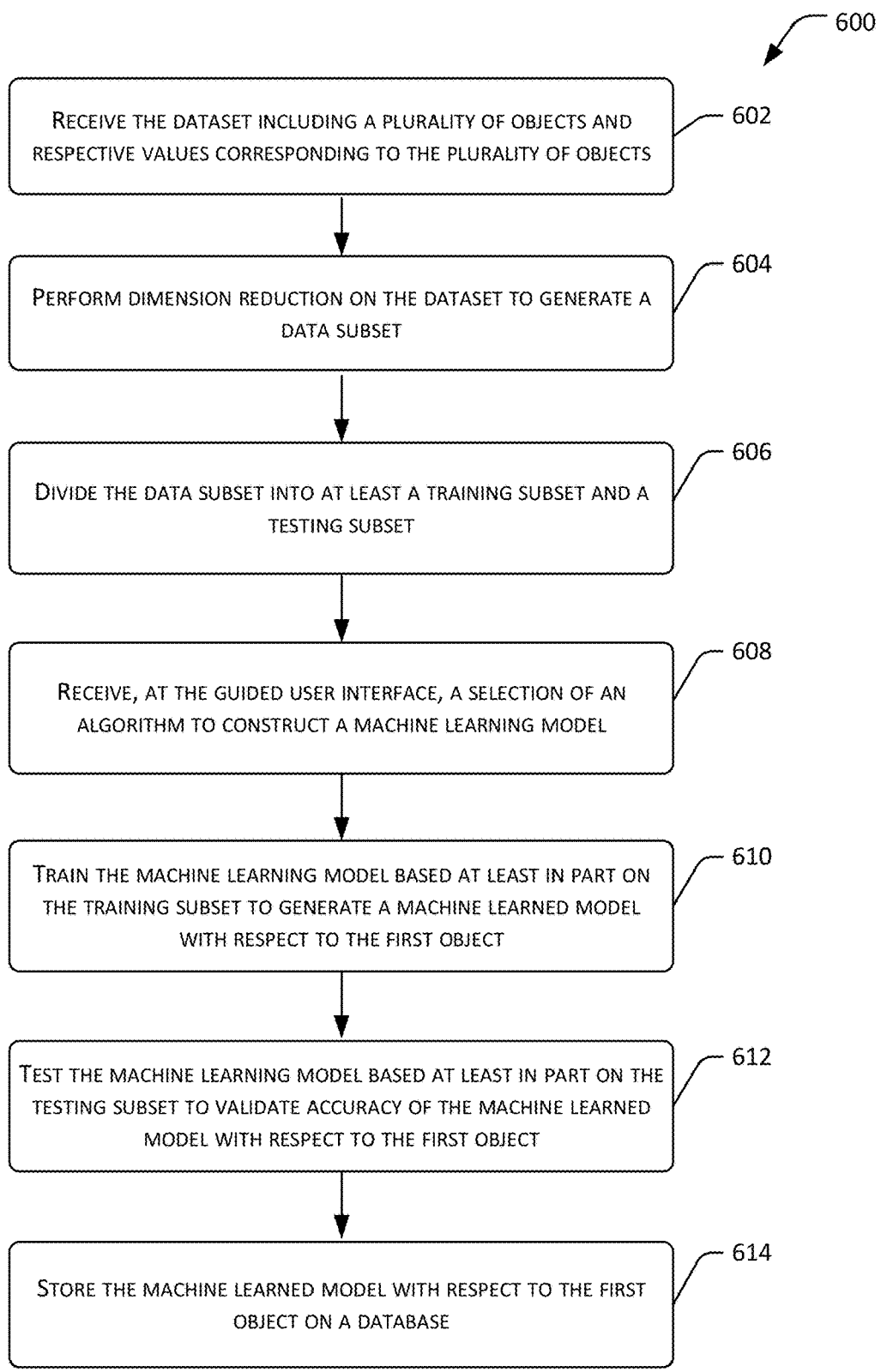
FIG. 6 illustrates another example flow chart for generating an ML model generation tool in accordance with an implementation of the present disclosure.

FIG. 6 illustrates another example flow chart 600 for generating an ML model generation tool in accordance with an implementation of the present disclosure.

At block 602, the model generating device 112-B may obtain the dataset including a plurality of objects and respective values corresponding to the plurality of objects. The dataset may include any combinations of the data stored on the storage device 112-C of the service provider 112, the data 114-1 from the one or more user devices 104, the data 114-2 from the one or more cloud devices 110, or the data 114-3 from the one or more storage device 108, etc. The In implementations, the operation of block 602 may be performed by the data summarization module 222 of the model generating device 112-B. The operation described at block 602 may be caused by a user operation on a guided user interface (GUI) of the ML model generation tool. For example, the user may select, via the GUI a dataset from a data resource and load the dataset to the local storage. The data resource may be located in a local storage or a remote storage. The user selection may generate a call to an application program interface (API), through which, the data summarization module 222 communicates with the data resource to retrieve the dataset.

At block 604, the model generating device 112-B may perform dimension reduction on the dataset to generate a data subset. The model generating device 112-B may implement various algorithms to perform dimension reduction on the dataset, such as, random forest algorithm, K-nearest neighbors algorithm, principle component analysis (PCA), single variable logistic regression algorithm, variable clustering algorithm, etc. The model generating device (e.g., the model generating device 112-B) may update the graphic user interface to facilitate the user to choose the algorithm for dimension reduction. The data subset, i.e., the low-dimension data subset, may be stored in a storage device and/or a storage space. In implementations, the operation of block 604 may be performed by the dimension reduction module 230 of the model generating device 112-B. The operation described at block 604 may be caused by a subsequent user operation on the guided user interface (GUI) of the ML model generation tool. In some examples, the GUI of the ML model generation tool may provide a plurality of available dimension reduction algorithms for the user to choose from. When the user operates on the GUI and makes a selection of the dimension reduction algorithm, a subsequent call to an API is generated. The subsequent call to the API causes the dimension reduction module 230 to perform dimension reduction on the dataset using the selected dimension reduction algorithm.

At block 606, the model generating device 112-B may divide the data subset into at least a training subset and a testing subset. For example, the data subset, i.e., the low-dimension data subset, may be split into three subsets, among which, two subsets of the data subset may be used for training and one subset of the data subset may be used for testing. It should be understood that the model generating device 112-B may divide the data subset into various number of subsets for training and testing. The present disclosure is not intended to be limiting. The user may select the parameter related to k-fold cross-validation on the guided user interface (GUI) of the ML model generation tool to define the split of the training subset and testing subset.

At block 608, the model generating device 112-B may receive, at the guided user interface, a selection of an algorithm to construct a ML model. The model generating device 112-B may update the guided user interface to guide the user to select the algorithm for the ML model. The algorithm to be used for the ML model may include supervised learning, unsupervised learning, semi-supervised learning, reinforcement learning, feature learning, sparse dictionary learning, etc. In some examples, the selection may include a combination of different algorithms for the ML model. In implementations, the operation of block 606 may be performed by the initialization module 232 of the model generating device 112-B.

At block 610, the model generating device 112-B may train the ML model based at least in part on the training subset to generate a trained ML model with respect to the first object. The low-dimension data subset filters out the objects and the associated values that are less influential to the first object and contains the objects and the associated values that are highly related to the first object. The operation described at block 610 may be triggered by a user operation on the GUI of the ML model generation tool to train the ML model. In implementations, the operation of block 608 may be performed by the training module 234 and the testing module 236 of the model generating device 112-B.

At block 612, the model generating device 112-B may test the machine learning model based at least in part on the testing subset to validate accuracy of the machine learned model with respect to the first object. The model generating device 112-B may use at least part of the testing subset as an input to the machine learning model to predict an output. The model generating device 112-B may compare the output with the corresponding value indicated in the testing subset to determine the accuracy of the machine learning model. When the difference between the output and the corresponding value indicated in the testing subset is no greater than a pre-set threshold, the model generating device 112-B may determine that the machine learning model satisfies the accuracy requirement. The operation described at block 612 may be triggered by a user operation on the GUI of the ML model generation tool to test the ML model.

At block 614, the model generating device 112-B may store the trained ML model with respect to the first object on a database. The trained ML model may be stored in a local storage device connected to the computer network of the service provider. Alternatively, or additionally, the trained ML model may be stored in a cloud storage space or a third-party storage space. In implementations, the operation of block 610 may be performed by the delivery module 238 of the model generating device 112-B. The operation described at block 614 may be triggered by a user operation on the GUI of the ML model generation tool to store the trained ML model. The GUI of the ML model generation tool may provide the locations to store the ML model. The user may select storing the ML model in a local computing device or a remote/cloud storage device.

In some examples, the GUI of the ML model generation tool may enable the user to implement the trained ML model on a cloud-based computing device to be distributed to any client devices connected to the network. The GUI of the ML model generation tool may also enable the user to define the privilege level of using the ML model, e.g., whether a user can modify the trained ML model, override the trained ML model, or build a new ML model, etc.

The example method described with respect to FIG. 6 transforms the high-dimensional dataset to a low-dimensional dataset for the ML model training. The dimension reduction on the dataset improves the speed and efficiency of the ML model training. Further, the dimension reduction on the dataset improves the prediction performance as the dimension reduction yields the highly-related variables but eliminates less-related variables.

Figure 7:
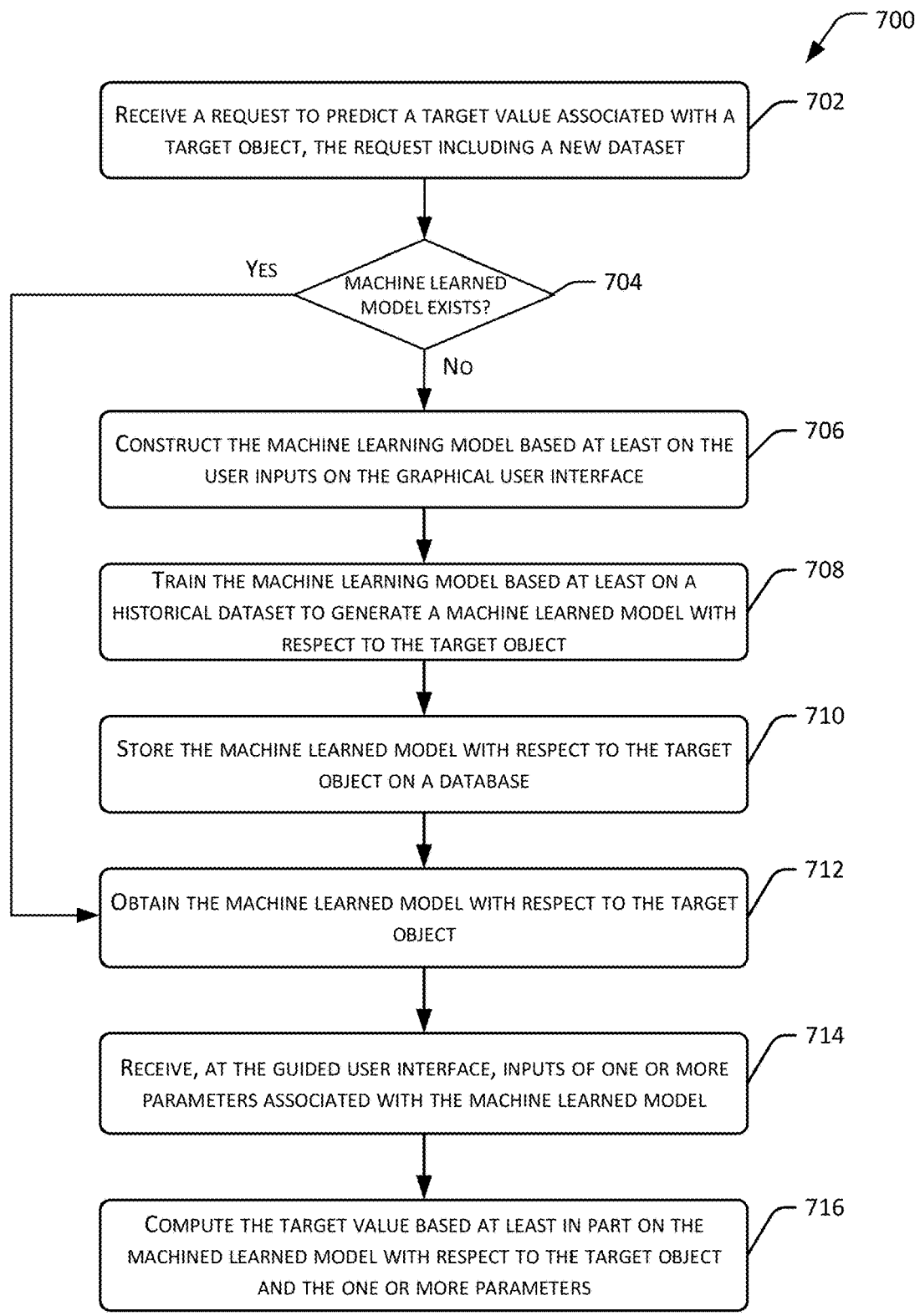
FIG. 7 illustrates another example flow chart for generating an ML model generation tool in accordance with an implementation of the present disclosure.

FIG. 7 illustrates another example flow chart 700 for generating the ML model generation tool for in accordance with an implementation of the present disclosure.

At block 702, the model generating device 112-B may receive a request to predict a target value associated with a target object, the request including a new dataset. The request to predict a target value may be received from the service provider or a third-party affiliated with the service provider. The new dataset may be in the same dimensions with the dataset used for training the ML model. In implementations, the new dataset may be in different dimensions from the dataset used for training the ML model. The operation described at block 702 may be caused by a user operation on a guided user interface (GUI) of the ML model generation tool. The user operation may generate a call to an application program interface (API), through which, the data summarization module 222 communicates with the data resource to retrieve the new dataset. In implementations, the operation of block 702 may be performed by the data summarization module 222 of the model generating device 112-B.

At block 704, the model generating device 112-B may determine whether the ML model exists. If the ML model exists (block 704—Yes), the model generating device 112-B may obtain the ML model with respect to the target object at block 712. The model generating device 112-B may obtain the ML model with respect to the target object from a local storage device and/or from a remote storage space via the network. The ML model may be previously trained using historical data and stored in the local storage device and/or the remote storage space.

If the trained ML model does not exist (block 704—No), the model generating device 112-B may construct the ML model in real-time based on the user inputs on the graphic user interface at block 706. At block 708, the model generating device 112-B may train the ML model based at least on a historical dataset to generate a ML model with respect to the target object. The historical dataset may be retrieved from the storage device 112-C, the one or more storage device 108, the one or more cloud devices 110, etc. At block 710, the model generating device 112-B may store the trained ML model with respect to the target object on a database. Details of constructing and training the ML model are described above in connection with FIGS. 4-6, and therefore, are not repeated herein. In implementations, the operations of block 704-710 may be performed by one or more of the data summarization module 222, the data pre-processing module 224, the data visualization module 226, the data correlation discovery module 228, the dimension reduction module 230, the initialization module 232, the training module 234, the testing module 236, or the delivery module 238 of the model generating device 112-B.

At block 714, the model generating device 112-B may receive, at the guided user interface, inputs of one or more parameters associated with the ML model. For example, and without limitation, the one or more parameters may include an algorithm to be used for the ML model, a target variable or object to be predicted, one or more key features used to predict the target variable, etc. The model generating device 112-B may update the guided user interface to facilitate the user (e.g., the administrator 106) to choose different parameters to achieve better prediction results.

At block 716, the model generating device 112-B may compute the target value based at least in part on the trained ML model with respect to the target object and the one or more parameters.

In implementations, the trained ML model may be periodically re-trained based on updated dataset. For example, one or more parameters associated with the ML model and/or the trained ML model may be adjusted to predict different target objects. The re-trained ML model may be transmitted over the network 102 to be stored in the storage device or the storage space. In implementations, the prediction outcome with respect to a target object using the ML model may be provided to the service provider 112 or a third-party service provider. Various prediction outcomes with respect to a target object may also be available for comparison and decision making.

The ML generating methods and systems describes herein provides a web-based application that facilitates guided data assessment and discovery of data features impacting a target variable. Rather than hiring dedicated data scientists to analyze the data or using complex tools designed by vendors, the present disclosure provides a guided user interface to guide the user to configure the algorithms, parameters, and variables to generate an ML model. The present disclosure dynamically generates Python programs related to the ML model in a backend computer based on the user's inputs and/or selections through the guided user interface of the web-based application. The present disclosure eliminates time consuming operations to manually run through each variable in the dataset to identify correlations among the variables. Further, the present disclosure also improves the efficiencies to develop new ML models with respect to new target variables and/or modify existing ML models.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes implementations having specific structural features and/or methodological acts, it is to be understood that the claims are not necessarily limited to the specific features or acts described. Rather, the specific features and acts are merely illustrative some implementations that fall within the scope of the claims of the application.

What is claimed is:

1. A method implemented by a computing device for constructing a machine learning model generation tool, the method comprising:
generating a guided user interface (GUI) that enables a user to construct the machine learning model generation tool via one or more user operations on the GUI, the one or more user operations including:
obtaining, from a database, a dataset associated with a plurality of data objects;
generating, on the GUI, a visualization of a correlation of the dataset;
based on the visualization:
determining one or more characteristics associated with a first data object of the plurality of data objects;
identifying a subset of the dataset based at least in part on the one or more characteristics;
selecting at least one machine learning algorithm; and configuring the machine learning model generation tool to generate a machine learning (ML) model with respect to the first data object based on the subset of the dataset and the at least one machine learning algorithm; and implementing the machine learning model generation tool and the ML model with respect to the first data object in a cloud server to enable distributing at least one of the machine learning model generation tool or the ML model with respect to the first data object to a plurality of second computing devices via a network.

2. The method of claim 1, wherein the one or more user operations on the GUI further comprising at least one of:
   determining dimensions of the dataset;
   determining statistic information associated with the dataset;
   performing a null value treatment on the dataset; or
   performing an outlier value treatment on the dataset.

3. The method of claim 1, wherein the one or more characteristics associated with the first data object indicates correlations between the first data object and other data objects of the plurality of data objects.

4. The method of claim 1, wherein identifying a subset of the dataset based at least in part on the one or more characteristics further comprises:
   determining influence degrees between the first data object and other data objects of the plurality of data objects; and
   performing a dimension reduction on the dataset by mapping the dataset to the subset of the dataset based at least in part on the influence degrees,
   wherein a dimension of the subset of the dataset is less than a dimension of the dataset.

5. The method of claim 4, wherein the dimension reduction is performed using at least one of a random forest algorithm, a single variable logistic regression algorithm, or a variable clustering algorithm.

6. The method of claim 1, further comprising:
   receiving a request to predict a target value associated with a target object, the request including a new dataset; and
   executing the machine learning model generation tool to generate an additional machine learning model with respect to the target object;
   configure one or more parameters associated with the additional ML model with respect to the target object, the one or more parameters including at least one of an ML algorithm, one or more additional objects in the new dataset correlated to the target object, or a cross-validation parameter; and
   determine the target value, using the additional ML model, based at least in part on the target object and the one or more parameters.

7. The method of claim 1, wherein the cloud server is further configured to:
   receive, from a second computing device, a request for downloading a second machine learning model associated with a second data object; and
   determine whether the second machine learning model exists in the cloud server, wherein:
   in response to determining the second machine learning model exists in the cloud server, distribute an instance of the second machine learning model to the second computing device, and
   in response to determining the second machine learning model does not exist in the cloud server, distribute an instance of the machine learning model generation tool to the second computing device, causing an execution of the machine learning model generation tool on the second computing device to generate the second machine learning model associated with the second data object.

8. A system for constructing a machine learning model generation tool, comprising:
   at least one processor; and
   memory storing instructions that, when executed by the at least one processor, cause the at least one processor to perform actions comprising:
   generating a guided user interface (GUI) that enables a user to construct the machine learning model generation tool, the one or more user operations including:
      obtaining, from a database, a dataset including a plurality of data objects;
      generating, on the GUI, a visualization of a correlation of the dataset;
      based on the visualization,
         determining one or more characteristics associated with a first data object of the plurality of data objects;
         identifying a subset of the dataset based at least in part on the one or more characteristics;
         selecting at least one machine learning algorithm; and
         configuring the machine learning model generation tool to generate a machine learning (ML) model with respect to the first data object based on the subset of the dataset and the at least one machine learning algorithm; and
      implementing the machine learning model generation tool and the ML model with respect to the first data object in a cloud server to enable distributing at least one of the machine learning model generation tool or the ML model with respect to the first data object to a plurality of second computing devices via a network.

9. The system of claim 8, wherein the one or more operations further comprise at least one of:
   determining dimensions of the dataset;
   determining statistic information associated with the dataset;
   performing a null value treatment on the dataset; or
   performing an outlier value treatment on the dataset.

10. The system of claim 8, wherein the one or more characteristics associated with the first data object indicates correlations between the first data object and other data objects of the plurality of data objects.

11. The system of claim 8, wherein identifying a subset of the dataset based at least in part on the one or more characteristics further comprises:
   determining influence degrees between the first data object and other data objects of the plurality of data objects; and
   performing a dimension reduction on the dataset by mapping the dataset to the subset of the dataset based at least in part on the influence degrees,
   wherein the dimension of the subset of the dataset is lower than the dimension of the dataset.

12. The system of claim 8, wherein the dimension reduction is performed using at least one of a random forest algorithm, a single variable logistic regression algorithm, or a variable clustering algorithm.

13. The system of claim 8, wherein the one or more operations further comprise:

receiving a request to predict a target value associated with a target object, the request including a new dataset; and executing the machine learning model generation tool to
- generate an additional machine learning model with respect to the target object;
- configure one or more parameters associated with the additional ML model with respect to the target object, the one or more parameters including at least one of an ML algorithm, one or more additional objects in the new dataset correlated to the target object, or a cross-validation parameter; and
- determine the target value, using the additional ML model, based at least in part on the target object and the one or more parameters.

14. A computer-readable storage medium storing computer-readable instructions executable by one or more processors for constructing a machine learning model generation tool, that when executed by the one or more processors, cause the one or more processors to perform actions comprising:

generating a guided user interface (GUI) that enables a user to construct the machine learning model generation tool via one or more user operations on the GUI, the one or more user operations including:
- obtaining, from a database, a dataset including a plurality of data objects;
- generating, on the GUI, a visualization of a correlation of the dataset;
- based on the visualization,
  - determining one or more characteristics associated with a first data object of the plurality of data objects;
  - identifying a subset of the dataset based at least in part on the one or more characteristics;
  - selecting at least one machine learning algorithm; and
  - configuring the machine learning model generation tool to generate training a machine learning (ML) model with respect to the first data object using based on the subset of the dataset and the at least one machine learning algorithm; and
- implementing the machine learning model generation tool and the trained ML model with respect to the first data object in a cloud server to enable distributing at least one of the machine learning model generation tool or the ML model with respect to the first data object to a plurality of second computing devices via a network.

15. The computer-readable storage medium of claim 14, wherein the one or more operations further comprise at least one of:
- determining dimensions of the dataset;
- determining statistic information associated with the dataset;
- performing a null value treatment on the dataset; or
- performing an outlier value treatment on the dataset.

16. The computer-readable storage medium of claim 14, wherein the one or more characteristics associated with the first data object indicates correlations between the first data object and other data objects of the plurality of data objects.

17. The computer-readable storage medium of claim 16, wherein identifying a subset of the dataset based at least in part on the one or more characteristics further comprises:
- determining influence degrees between the first data object and other data objects of the plurality of data objects; and
- performing a dimension reduction on the dataset by mapping the dataset to the subset of the dataset based at least in part on the influence degrees,
- wherein the dimension of the subset of the dataset is lower than the dimension of the dataset.

18. The computer-readable storage medium of claim 14, wherein the dimension reduction is performed using at least one of a random forest algorithm, a single variable logistic regression algorithm, or a variable clustering algorithm.

19. The computer-readable storage medium of claim 14, wherein the one or more operations further comprise:
- receiving a request to predict a target value associated with a target object, the request including a new dataset; and
- executing the machine learning model generation tool to
  - generate an additional machine learning model with respect to the target object;
  - configure one or more parameters associated with the additional trained ML model with respect to the target object, the one or more parameters including at least one of an ML algorithm, one or more additional objects in the new dataset correlated to the target object, or a cross-validation parameter; and
  - determine the target value, using the additional ML model, based at least in part on the target object and the one or more parameters.

* * * * *